Patented May 11, 1937

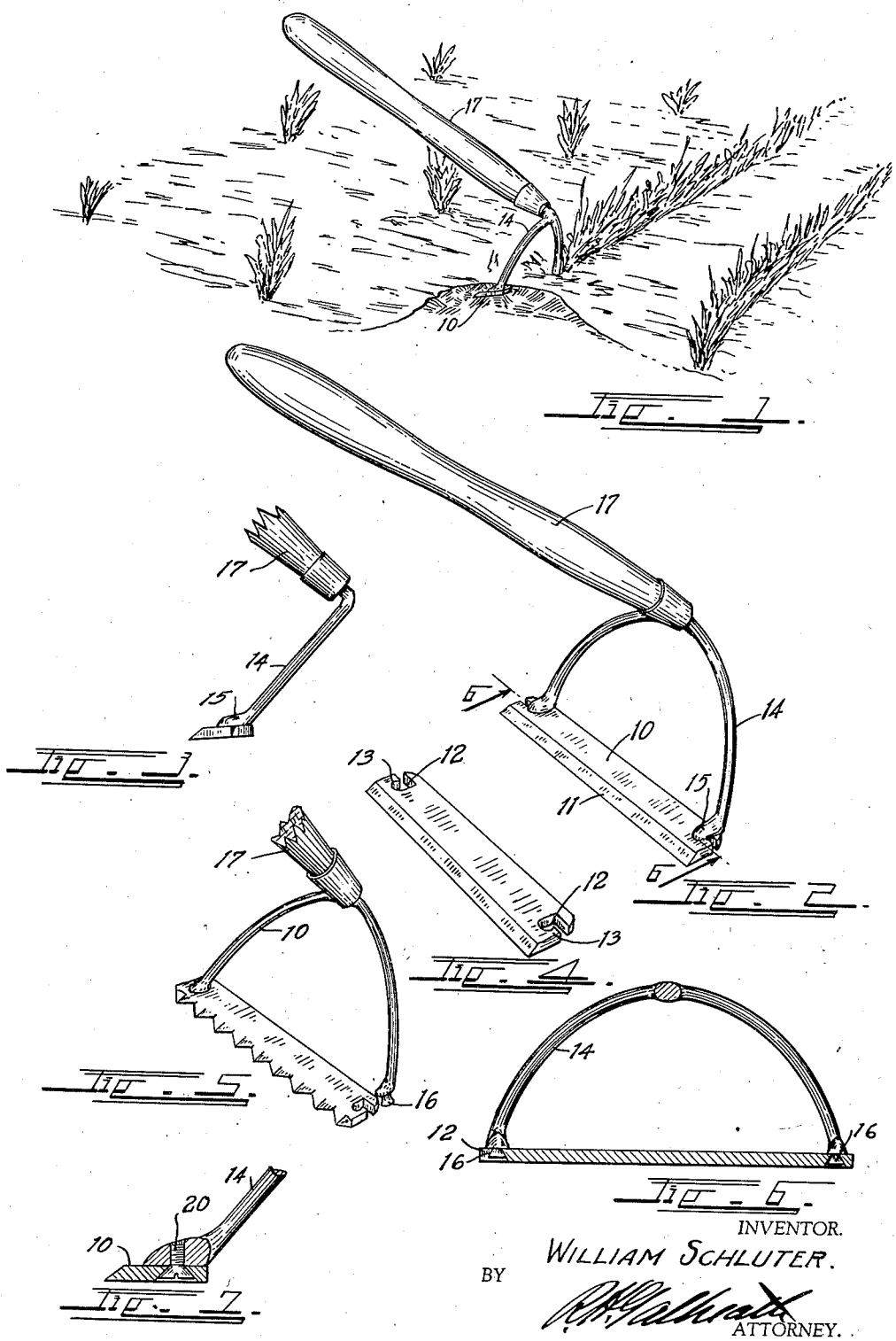

2,079,879

UNITED STATES PATENT OFFICE 2,079,879

HAND BLOCKING TOOL FOR SUGAR BEETS

William Schluter, Brighton, Colo.

Application July 27, 1936, Serial No. 92,828

2 Claims. (Cl. 97—68)

This invention relates to a blocking or thinning tool for row planted crops. The invention is more particularly designed for use in thinning or blocking sugar beet plants. An ordinary hoe is not satisfactory for the above purpose, since it lifts a pile of soil which destroys the contour of the row and occasionally covers the adjacent remaining plants. Also, the large amount of soil which is moved by the ordinary hoe requires a large expenditure of physical exertion.

The principal object of this invention is to provide an implement of this character which will not require the operator to lift any soil and which can be quickly and easily drawn through the row so as to cut out the undesired plants without disturbing the remainder of the row and with but a minimum of physical exertion.

Another object of the invention is to provide means for attaching and detaching the blade for sharpening or renewal purposes, which can be quickly and easily operated without the use of tools.

Other objects and advantages reside in the detail construction of the invention, which is designed for simplicity, economy, and efficency. These will become more apparent from the following description.

In the following detailed description of the invention reference is had to the accompanying drawing which forms a part hereof. Like numerals refer to like parts in all views of the drawing and throughout the description.

In the drawing:

Fig. 1 illustrates the improved implement in use.

Fig. 2 is a perspective view thereof.

Fig. 3 is an end elevation of the blade portion thereof.

Fig. 4 is a detail perspective view of one form of the blade.

Fig. 5 illustrates an alternate form of blade.

Fig. 6 is a longitudinal section through the blade of Fig. 2, taken on the line 6—6, Fig. 2.

Fig. 7 is a detail cross section illustrating an alternate method of attaching the blade.

The preferred form of the invention comprises a straight blade 10. The blade 10 is relatively narrow, and provided with a bevelled sharpened edge 11.

In each extremity of the blade are L-shaped slots 12 terminating at their inner extremities in inwardly turned hooks 13. The blade is carried in a resilient yoke 14, the extremities of which terminate in feet 15 which rest upon the upper face of the blade 10. Wedge shaped bosses 16 project downwardly from each of the feet 18. The normal width of the yoke 14 is greater than the normal length of the blade 10.

In attaching the blade, one extremity is hooked around one of the bosses 16 with the latter resting against the hook-shaped portion 13 of the slot 12. The other extremity is then forced inwardly into the hook-shaped extremity of the other slot. The natural inherent elasticity of the yoke constantly tends to expand it and maintain the blade tightly in position. The yoke is provided with any suitable handle 17.

It is preferred to have the yoke extend at right angles to the axis of the handle 17, as shown in Fig. 3. The feet are so shaped as to hold the blade 10 at a downward incline from the plane of the yoke 14 as shown in the same view.

In use, the blade is drawn through the row as shown in Fig. 1, causing it to cut and elevate the roots of the undesired plants without disturbing the soil along the row. It can be seen that it is impossible to pull or pile the soil about the plants, regardless of how deep the hoe may be forced.

Any desired type of blade may be employed. In Fig. 5, a toothed blade is illustrated, which gives a greater cutting action.

While a quick detachable blade construction has previously been described, if is preferred, the blade may be attached to the yoke 14 in any desired manner, such as by means of counter-sunk screws 20, as shown in Fig. 7.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A plant blocking tool comprising a relatively narrow straight blade, a resilient U-shaped yoke disposed over said blade with its ends spaced from each other a distance at variance with the length of the blade, a handle projecting from said yoke, said blade having L-shaped slots leading from its ends and having inner end portions extending transversely of the blade and enlarged to form seats, and depending upwardly tapered wedge-shaped lugs at ends of said yoke entering said slots and engaged in the seats at the inner ends thereof, resilience of said yoke maintaining said lugs in the slots.

2. A plant blocking tool comprising a relatively narrow straight blade, a resilient U-shaped yoke disposed over said blade with its ends spaced from each other a distance at variance with the length of the blade, a handle projecting from said yoke, said blade having L-shaped slots leading from its ends and having inner end portions extending transversely of the blade and enlarged to form seats, and depending upwardly tapered wedge-shaped lugs at ends of said yoke entering said slots and engaged in the seats at the inner ends thereof, end portions of said yoke being formed with feet projecting laterally of the blade and bearing against the upper face of the blade when the lugs are engaged in the slots whereby the blade will be gripped between the feet and the lugs.

WILLIAM SCHLUTER.